United States Patent
Lan (10) Patent No.: US 6,722,690 B2
(45) Date of Patent: Apr. 20, 2004

(54) FOLDABLE STROLIER

(76) Inventor: Red Lan, 15F, No. 108, Sec. 1, Hsin Tai 5th Rd., Hsinchih, Taipei Hsien (TW)

( * ) Notice: Subject to any disclaimer, the term of this patent is extended or adjusted under 35 U.S.C. 154(b) by 8 days.

(21) Appl. No.: 10/222,224

(22) Filed: Aug. 16, 2002

(65) Prior Publication Data

US 2003/0057680 A1 Mar. 27, 2003

(51) Int. Cl.⁷ .................................................. B62B 1/00
(52) U.S. Cl. ....................... 280/642; 280/647; 280/650; 280/47.38
(58) Field of Search .................. 280/642, 639, 280/38, 40, 641, 643, 645, 46, 42, 647, 648, 649, 650, 651, 652, 654, 655, 657, 658, 47.18, 47.25, 47.26, 47.29, 47.38, 47.41, 62, 47.34; 403/102, 321, 322.1, 322.4

(56) References Cited

U.S. PATENT DOCUMENTS

| | | | | |
|---|---|---|---|---|
| 5,370,408 A | * | 12/1994 | Eagan | 280/642 |
| 5,695,212 A | * | 12/1997 | Hinkston | 280/642 |
| 6,073,957 A | * | 6/2000 | Lan | 280/642 |
| 6,105,998 A | * | 8/2000 | Baechler et al. | 280/650 |
| 6,152,476 A | * | 11/2000 | Huang | 280/642 |
| 6,193,263 B1 | * | 2/2001 | Lin | 280/643 |
| 6,238,125 B1 | * | 5/2001 | Lin | 403/102 |
| 6,267,405 B1 | * | 7/2001 | Chen | 280/650 |

FOREIGN PATENT DOCUMENTS

GB 0123005.1 9/2001

* cited by examiner

*Primary Examiner*—Brian L. Johnson
*Assistant Examiner*—Hau Phan
(74) *Attorney, Agent, or Firm*—Brinks Hofer Gilson & Lione (57) ABSTRACT

A foldable stroller includes a positioning member disposed fixedly on one inclined lower rod of a front wheel unit, and a guideway member disposed fixedly on one inclined upper rod of a handle unit. A resilient element biases an abutment surface of a sliding element to engage a positioning surface of the positioning member, thereby locking the handle unit releaseably on the front wheel unit. The abutment surface and the positioning surface are inclined with respect to the longitudinal directions of the upper and lower rods. Actuation of a connecting element results in separation of the abutment surface from the positioning surface, thereby permitting folding of the handle unit on the front wheel unit.

9 Claims, 10 Drawing Sheets

FOLDABLE STROLLER

CROSS REFERENCED TO RELATED APPLICATION

The present application claims priority to United Kingdom Application No. 0123345.1, filed Sep. 27, 2001.

BACKGROUND OF THE INVENTION

1. Field of the Invention

This invention relates to a stroller, and more particularly to a foldable stroller, which includes a handle unit that can be folded on a wheel unit and that can be positioned firmly relative to the remaining parts of the stroller when unfolded from the wheel unit.

2. Description of the Related Art

Figure 1:
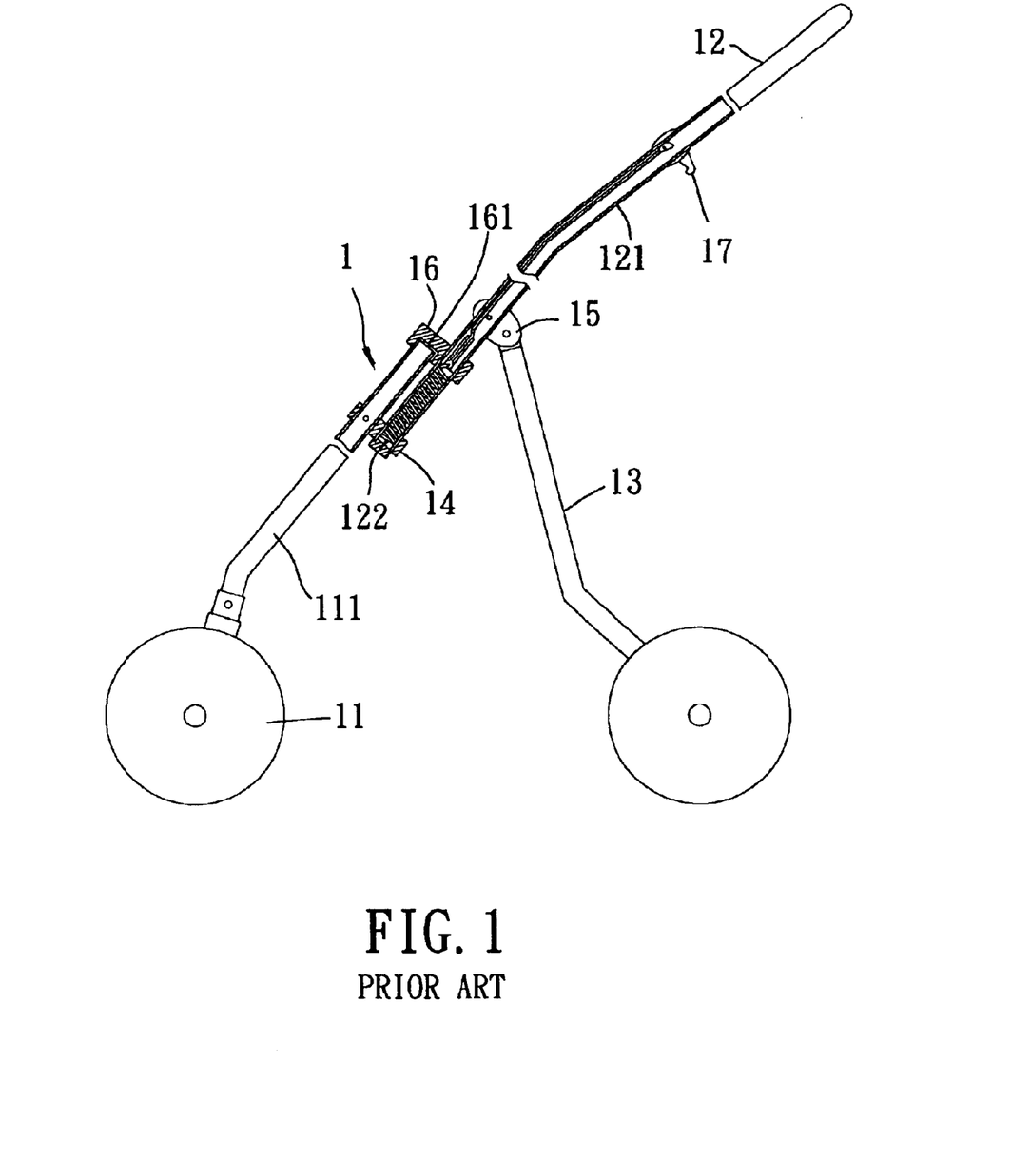
FIG. 1 is a schematic side view of a conventional foldable stroller.

Referring to FIG. 1, a conventional foldable stroller 1 is shown to include a front wheel unit 11, a handle unit 12, a rear wheel unit 13, a pair of left and right pivot members 14 that are disposed fixedly on the front wheel unit 11, two connectors 15, a pair of left and right retaining members 16, and a pair of left and right control mechanisms 17. The front wheel unit 11 includes a pair of inclined left and right lower rods 111. The handle unit 12 includes a pair of inclined left and right upper rods 121, which are connected respectively and rotatably to the pivot elements 14 by means of two pivot pins 122. The connectors 15 are disposed respectively and fixedly on the upper rods 121, and are connected pivotally to the rear wheel unit 13. The retaining members 16 are biased forwardly and downwardly to press against the lower rods 111, respectively, thereby engaging retaining holes 161 in the retaining members 16 with the upper ends of the lower rods 111 accordingly.

When it is desired to fold the stroller 1, the control mechanisms 17 are actuated so as to move the retaining members 16 rearwardly and upwardly away from the lower rods 111. As soon as the holes 161 in the retaining members 16 separate from the upper ends of the lower rods 111, the handle unit 12 is rotated clockwise about the pivot pins 122 so that the handle unit 12 and the rear wheel unit 13 can be folded on the front wheel unit 11. Thereafter, when it is desired to unfold the stroller 1, the handle unit 12 is rotated counterclockwise to a position where the holes 161 in the retaining members 16 are aligned with the lower rods 111 such that the retaining members 16 are biased to engage the holes 161 with the upper ends of the lower rods 111, thereby locking the upper rods 121 relative to the lower rods 111.

The aforesaid conventional foldable stroller 1 suffers from a drawback in that the holes 161 in the retaining members 16 are sized so that when the upper ends of the lower rods 111 engage the holes 161, significant clearances are present between the upper ends of the lower rods 111 and the walls of the retaining members 16 defining the holes 161 in order to ensure smooth engagement between the lower rods 111 and the holes 161. As such, when the stroller 1 is unfolded, the handle unit 12 cannot be positioned firmly relative to the front and rear wheel units 11, 13.

SUMMARY OF THE INVENTION

The object of this invention is to provide a foldable stroller, which includes a handle unit that can be positioned firmly relative to the remaining parts of the stroller when the stroller is unfolded.

According to this invention, a foldable stroller includes a front wheel unit with a pair of rearwardly and upwardly inclined left and right lower rods, each of which has an upper end. Two positioning members are disposed respectively and fixedly on the upper ends of the left and right lower rods. Each of the positioning members has an upper end, which is formed with:

a rearwardly and upwardly inclined planar positioning surface forming an acute angle with respect to the longitudinal direction of the left and right lower rods, and a guiding surface extending generally and downwardly from the upper end of the positioning surface.

A handle unit includes a grip and a pair of inclined left and right upper rods that are fixed to and that extend respectively, forwardly and downwardly from two opposite ends of the grip. Each of the left and right upper rods is parallel to the left and right lower rods, and has a lower end. Two guideway members are disposed respectively and fixedly on the lower ends of the left and right upper rods, and are connected respectively and pivotally to the positioning members. A rear wheel unit is disposed pivotally on the lower ends of the left and right upper rods, and is located behind the front wheel unit. A link interconnects pivotally the front and rear wheel units. Each of a pair of left and right control mechanisms includes:

a sliding element disposed slidably within a respective one of the guideway members and guided to move in the longitudinal direction of the left and right lower rods, the sliding element being formed with a planar abutment surface that engages the positioning surface of a respective one of the positioning members and that has a lower end, and an engaging surface that extends generally and upwardly from the lower end of the abutment surface, the abutment surface and the engaging surface defining a tip of the sliding element therebetween;

a resilient element for biasing the abutment surface of the sliding element to engage the positioning surface of the respective one of the positioning members, thereby preventing rotation of the left and right upper rods relative to the left and right lower rods;

an actuator element disposed operably on the handle unit; and an elongated connecting element having an upper end that is fastened to the actuator element, and a lower end that is fastened to the sliding element so that actuation of the actuator element results in separation of the abutment surface of the sliding element from the positioning surface of the positioning member against the biasing action of the resilient element, thereby permitting folding of both the handle unit and the rear wheel unit on the front wheel unit, after which the handle unit and the rear wheel unit can be unfolded from the front wheel unit so that the engaging surface of the sliding element slides over the guiding surface of the respective one of the positioning members such that the abutment surface of the sliding element is biased by the resilient element to engage the positioning surface of the respective one of the positioning members.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Referring to FIGS. 2, 3, 4, 4A, and 5, the preferred embodiment of a foldable stroller according to this invention is shown to include a front wheel unit 2, two positioning members 3, a handle unit 4, two guideway members 5, a rear wheel unit 6, a pair of left and right control mechanisms 7, two locking units 8, and a link 9. The link 9 (see FIGS. 2, 3, and 6) interconnects the front and rear wheel units 2, 6 pivotally.

The front wheel unit 2 includes a pair of inclined left and right lower rods 21, a front wheel-supporting frame 22, a front wheel 23, and two protective sleeves 24. The lower rods 21 have lower ends that are connected fixedly to the frame 22. The structure of the frame 22 can be changed to support two front wheels 23. The protective sleeves 24 are sleeved respectively and fixedly on upper end portions of the lower rods 21, and are not shown in FIGS. 3, 4, 4A, 5, 6, and 9 for the sake of brevity.

Figure 3:
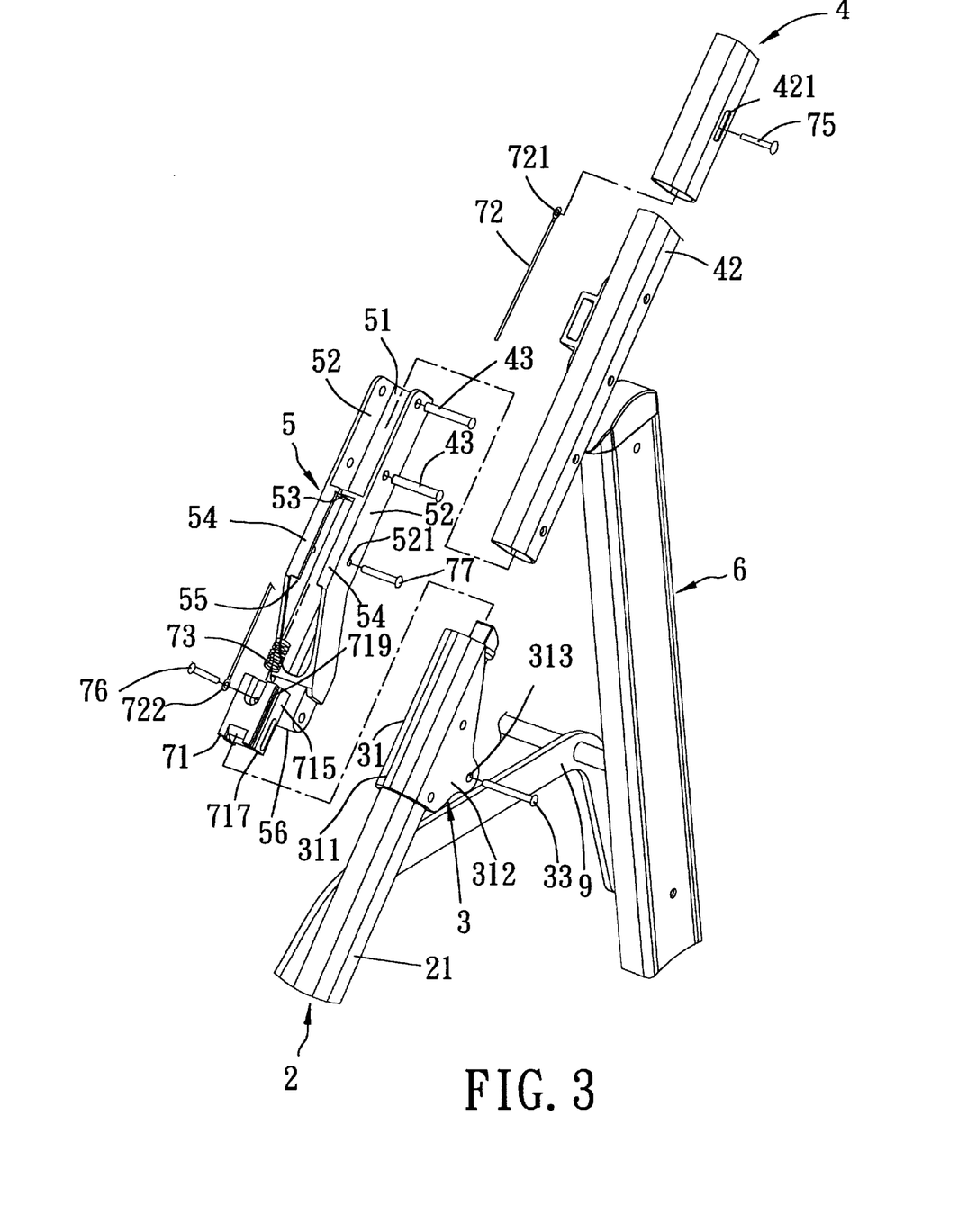
FIG. 3 is a partly exploded fragmentary perspective view of the preferred embodiment, illustrating a connection between an upper rod of a handle unit and a lower rod of a front wheel unit.
Figure 4:
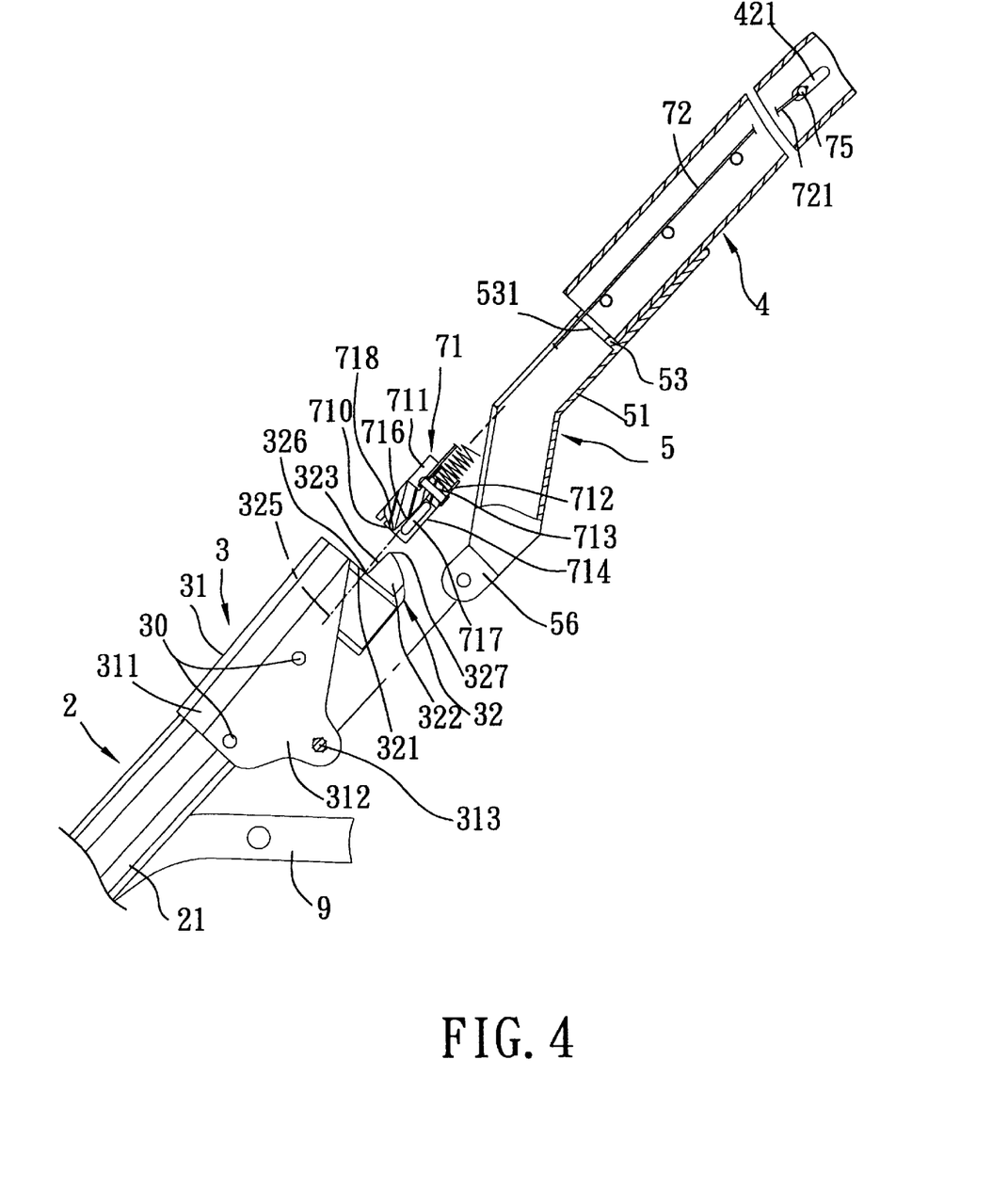
FIG. 4 is a partly sectional fragmentary side view of the preferred embodiment, illustrating the connection between the upper and lower rods.
Figure 4A:
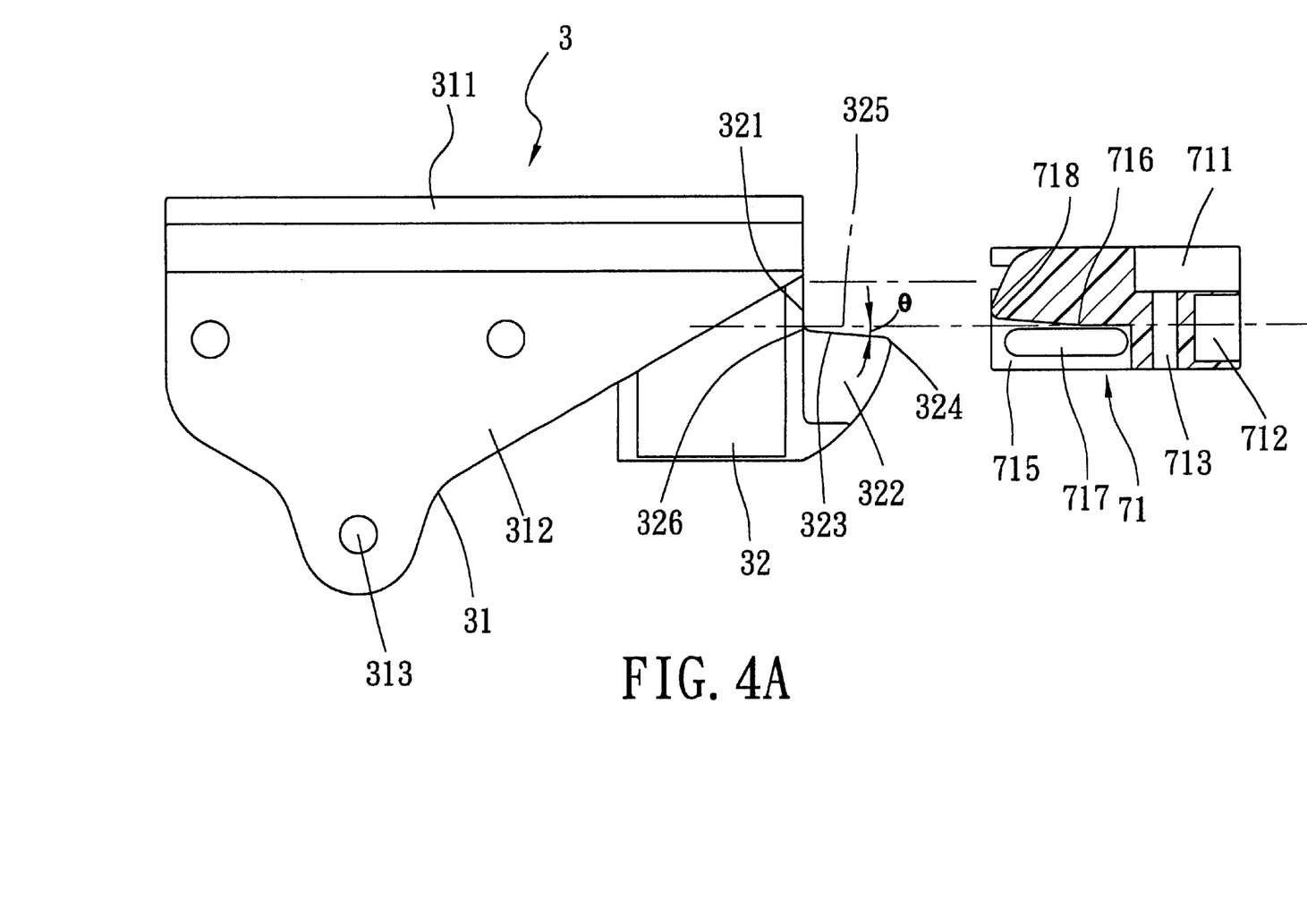
FIG. 4A is an exploded fragmentary side view of the preferred embodiment, illustrating the relationship between a sliding element and a positioning member, which are connected respectively to the upper and lower rods and which can be separated from each other so as to permit folding of the handle unit on the front wheel unit.
Figure 5:
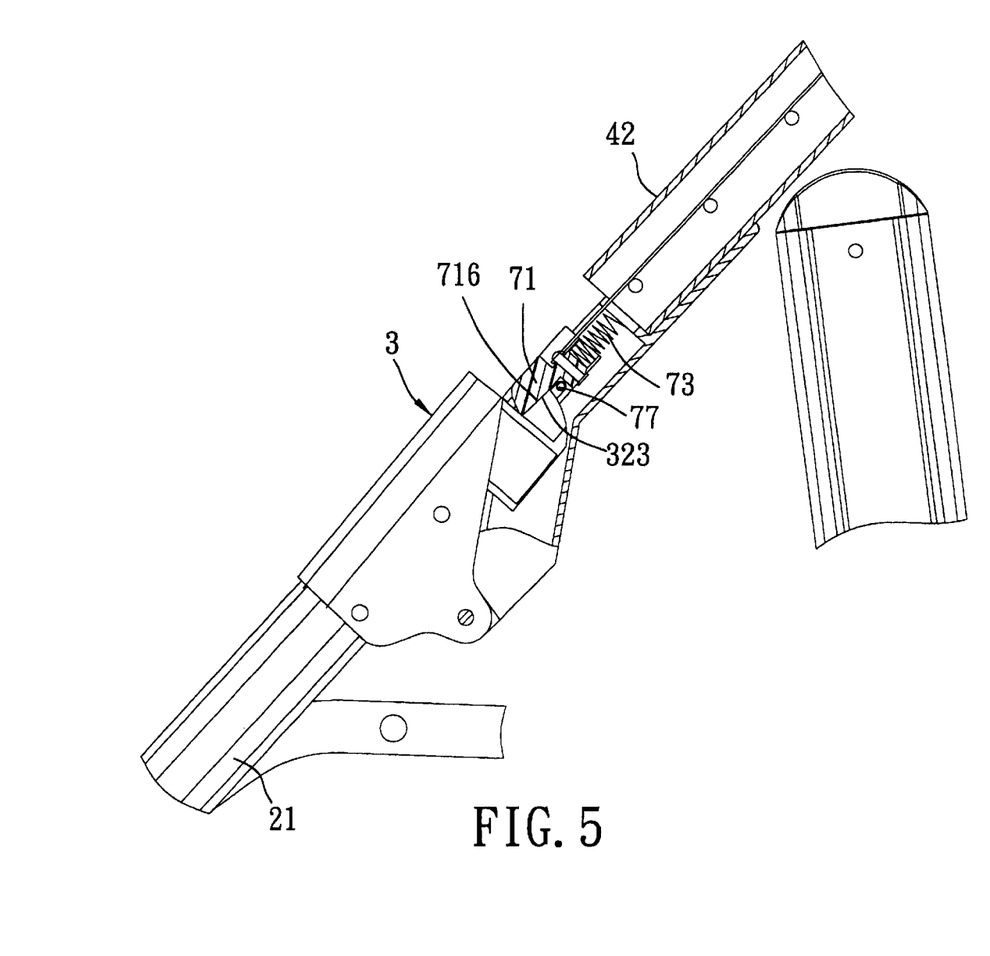
FIG. 5 is a partly sectional fragmentary side view of the preferred embodiment when the sliding element is disposed at a locking position, in which the handle unit is locked on the front wheel unit.

Each of the positioning members 3 is mounted fixedly to the respective lower rod 21 by means of two pins 30, and includes a mounting portion 31 (see FIG. 4), a slide-engaging seat 32, and a pivot pin 33 (see FIG. 3). Each mounting portion 31 is generally inverted U-shaped, and includes a curved upper section 311 (see FIG. 4) that is sleeved fixedly on the corresponding lower rod 21, and two aligned vertical lugs 312 (see FIG. 4) that extend integrally and downwardly from the upper section 311 and that have aligned pivot holes 313 (see FIG. 4). The pivot pins 33 (see FIG. 3) extend through the lower ends of the guideway members 5 and the pivot holes 313 in the positioning members 3, thereby connecting the guideway members 5 rotatably to the front wheel unit 2.

Each slide-engaging seat 32 extends integrally, rearwardly, and upwardly from the corresponding mounting portion 31, and is formed with a rearwardly and downwardly inclined planar stop surface 321, and a slide-engaging block 322 that has a rearwardly and upwardly inclined planar positioning surface 323 and a curved guiding surface 324. Each stop surface 321 is perpendicular to the lower rods 21, and has a front upper portion and a rear lower portion. Each positioning surface 323 has a lower end 326, which extends from and which is inclined with respect to the rear lower portion of the corresponding stop surface 321 such that an obtuse angle is formed between the stop surface 321 and the positioning surface 323. Preferably, the obtuse angle is between 95° and 100°. As such, the positioning surface 323 forms an acute angle θ (see FIGS. 4 and 4A) of between 5° and 10° with respect to a hypothetical line 325 (shown in phantom lines in FIGS. 4 and 4A), which extends through a line between the stop surface 321 and the positioning surface 323 in a direction that is parallel to the lower rods 21. Each curved guiding surface 324 extends generally and downwardly from the upper end 327 of the corresponding positioning surface 323.

The handle unit 4 includes a horizontal grip 41, a pair of inclined left and right upper rods 42 in the form of hollow tubes, two sets of lock pins 43, two connecting sleeves 44, and two horizontal pivot pins 45. The upper rods 42 are fixed to and extend respectively, forwardly and downwardly from two opposite ends of the grip 41. Each of the upper rods 42 is parallel to the lower rods 21, and has an upper end portion that is formed with a longitudinal slot 421 through a wall thereof. The lock pins 43 connect the connecting sleeves 44 respectively and fixedly to the upper rods 42. Each of the connecting sleeves 44 is formed with two aligned integral vertical plates 441, through which the respective pivot pin 45 extends. The pivot pins 45 also extend respectively through two vertical supporting rods 61 of the corresponding rear wheel unit 6, thereby connecting the rear wheel unit 6 rotatably to the handle unit 4.

The guideway members 5 (see FIGS. 3, 4, and 4A) are disposed respectively and fixedly on the lower ends of the left and right upper rods 42 by means of the lock pins 43, and are connected respectively and pivotally to the positioning members 3. Each of the guideway members 5 includes an inclined bottom wall 51 that has a front lower portion and a rear upper portion. Two sidewalls 52 extend respectively, integrally and upwardly from the opposite sides of the bottom wall 51. A partition 53 is formed integrally with an intermediate portion of the bottom wall 51 and the side walls 52, and is formed with an open-ended slot 531 therethrough. Two spaced-apart insert plates 54 extend respectively from upper end portions of the side walls 52 toward each other, and are disposed parallel to the bottom wall 51 so as to define a slide-receiving chamber 55 among the front lower portion of the bottom wall 51, the sidewalls 52 and the partition 53. The guideway member 5 has a lower end with an integral pivot portion 56 that is formed with a hole for extension of the corresponding pin 33 therethrough.

The rear wheel unit 6 is disposed behind the front wheel unit 2, and includes a brake mechanism 62 and two rear wheels 63.

Each of the left and right control mechanisms 7 includes a unitary sliding element 71, an elongated connecting element 72, a resilient element 73, an actuator element 74, a horizontal sliding pin 75, a lock pin 76, and a horizontal limiting pin 77.

Each the unitary sliding elements 71 is disposed slidably within the chamber 55 in the corresponding guideway member 5, is made of aluminum, and includes an engaging surface 710, a cable groove 711, a spring-receiving chamber 712, a pin hole 713, a block-receiving groove 714, two side walls 715, a planar abutment surface 716, and two slide slots 717.

The structure and operation of the left control mechanisms 7 and the left locking unit 8 will be described hereinafter. The engaging surface 710 (see FIGS. 4 and 4A) extends generally and upwardly from the lower end of the abutment surface 716. The lower end of the connecting element 72 extends into the cable groove 711, and is fastened to the lock pin 76. In this embodiment, the connecting element 72 is a cable that extends through the open-ended slot 531 in the partition 53 and into the corresponding upper rod 42. The lock pin 76 is fixed within the pin hole 713. The resilient element 73 is configured as a coiled compression spring, and has a lower end that is received within the spring-receiving chamber 712, and an upper end that presses against the partition 53 of the guideway member 5. That is to say, the resilient element 73 is disposed within the slide-receiving chamber 55 between the partition 53 and the sliding element 71 and between the bottom wall 51 and the side walls 52, thereby biasing the sliding element 71 away from the partition 53. The block-receiving groove 714 is defined between the side walls 715 so as to receive the slide-engaging block 322. The abutment surface 716 is inclined relative to the longitudinal direction of the sliding element 71, and engages the positioning surface 323 of the slide-engaging block 322. The abutment surface 716 and the engaging surface 710 define a tip 718 (see FIG. 4A) of the sliding element 71 therebetween. The slide slots 717 are formed respectively through the side walls 715. Each of the slide slots 717 has two closed ends. The horizontal limiting pin 77 extends through two pin holes 521 (see FIG. 3) in the side walls 52 of the guideway member 5 and the slide slots 717, thereby preventing removal of the sliding element 71 from the guideway member 5. As such, the sliding element 71 is movable synchronously with the connecting element 72, and is slidable within the guideway member 5. The sliding element 71 has two opposite vertical side surfaces, each of which is formed with an open-ended slide slot 719 (see FIG. 3), within which the corresponding insert plate 54 of the guideway member 5 is received slidably, thereby guiding the sliding element 71 to move within the guideway member 5 in the longitudinal direction of the upper rod 42. As such, the resilient element 73 biases the abutment surface 716 of the sliding element 71 to engage the positioning surface 323 of the positioning member 3, thereby preventing rotation of the left and right upper rods 42 relative to the left and right lower rods 21.

The actuator element 74 is disposed operably on the handle unit 4, and is constructed as a sliding sleeve, which is sleeved slidably on the upper rod 42 and which is connected fixedly to the sliding pin 75. The sliding pin 75 extends in a transverse direction of the upper rod 42, and is received slidably within the longitudinal slot 421 of the upper rod 42. The upper end of the connecting element 72 is fastened to the sliding pin 75.

Figure 2:
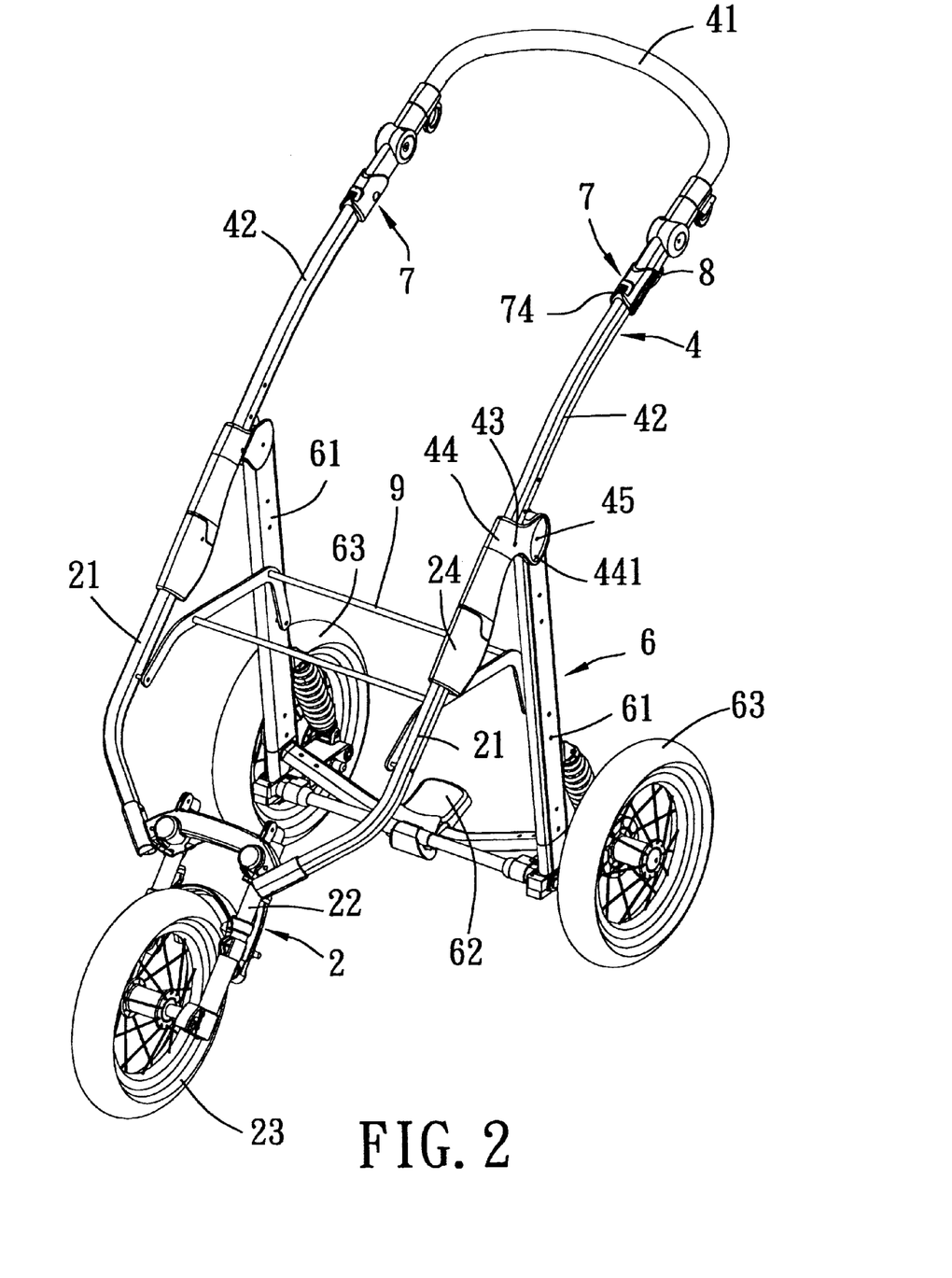
FIG. 2 is an assembled perspective view of the preferred embodiment of a foldable stroller according to this invention.
Figure 7:
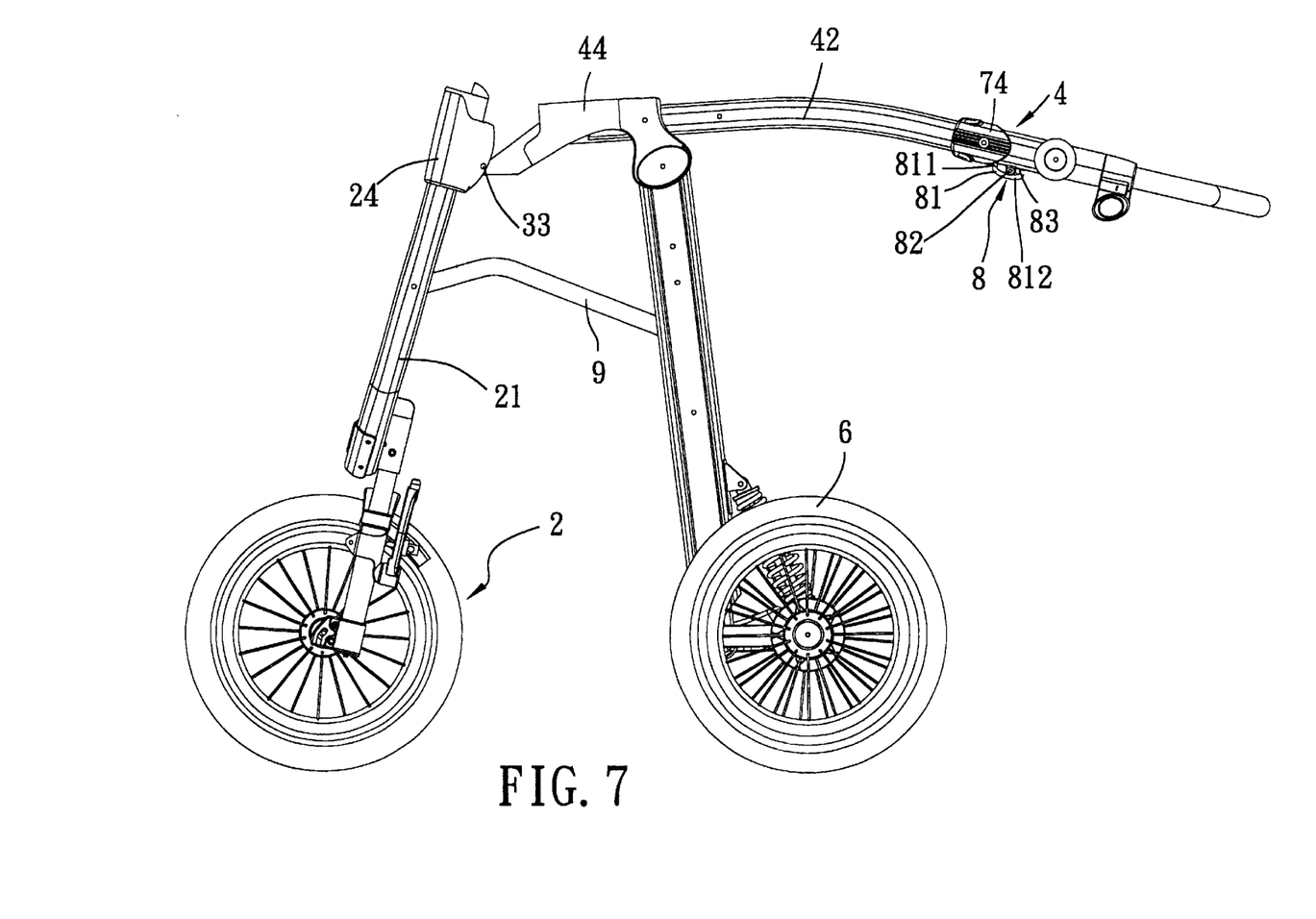
FIG. 7 is an assembled side view of the preferred embodiment when the handle unit is rotated relative to the front wheel unit such that the upper rods are in generally horizontal positions.

Referring to FIGS. 2 and 7, each of the locking units 8 includes a swing arm 81, a pivot pin 82, and a torsion spring 83. Each of the swing arms 81 has an intermediate portion that is disposed rotatably on the upper end of the upper rod 42 by means of the pivot pin 82, a pressing end 811 that is biased by the torsion spring 83 to press against the actuator element 81, thereby preventing movement of the actuator element 74 on the upper rod 42, and an actuating end 812 that can be actuated to release the pressing end 811 from the actuator element 74, thereby permitting the movement of the actuator element 74 on the upper rod 42.

Figure 6:
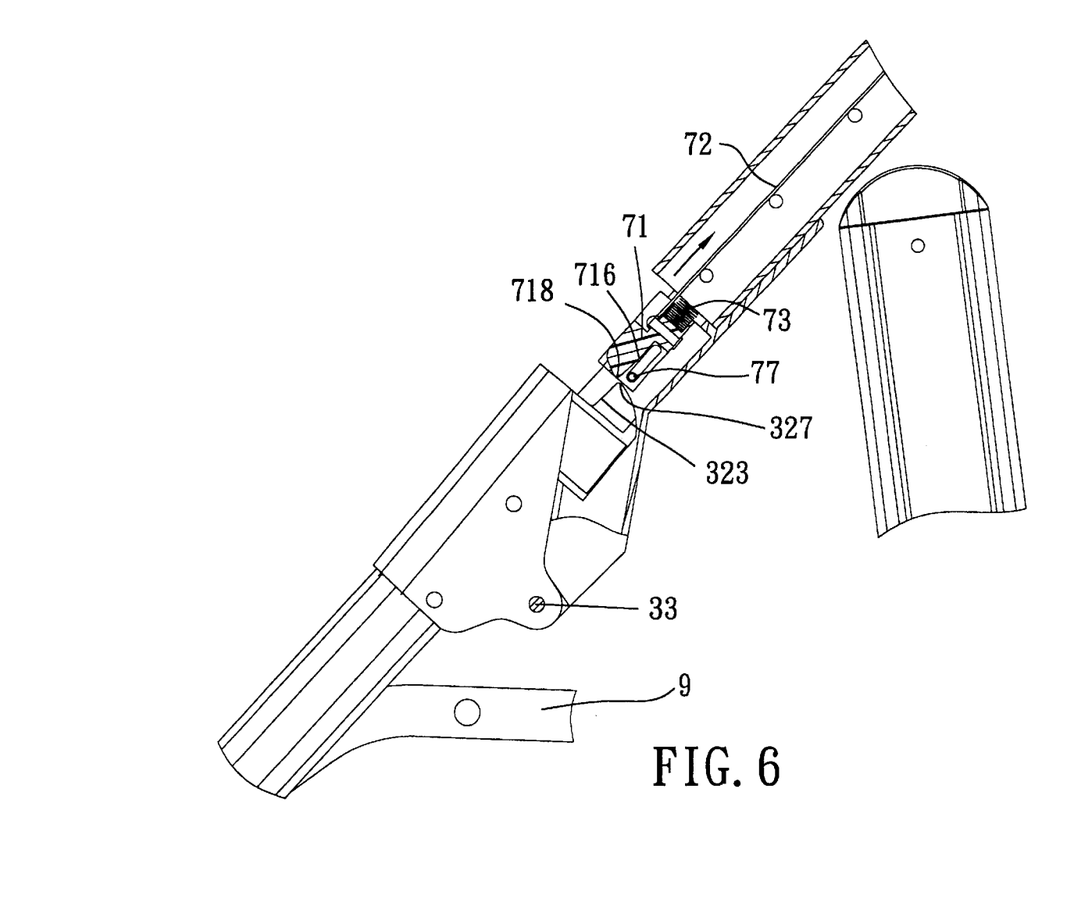
FIG. 6 is a partly sectional fragmentary side view of the preferred embodiment when the sliding element is disposed at an unlocking position, in which the handle unit can be folded on the front wheel unit.
Figure 8:
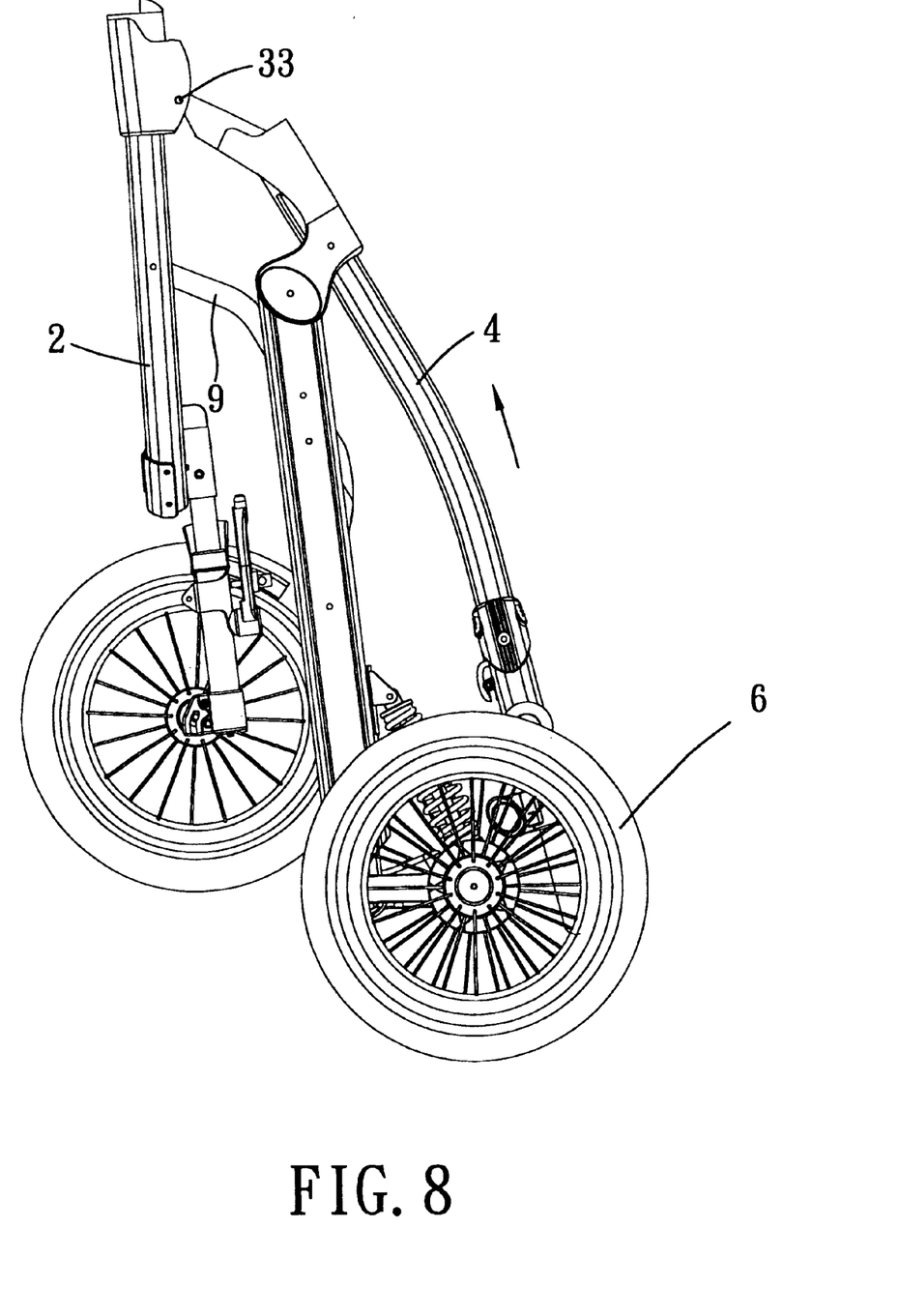
FIG. 8 is an assembled side view of the preferred embodiment when the handle unit is folded on the front wheel unit.

When it is desired to fold the stroller, the actuating end 812 of the swing arm 81 is pressed so as to release the actuator element 74 from the pressing end 811 of the swing arm 81. The actuator element 74 is pulled upward to separate the abutment surface 716 of the sliding element 71 from the positioning surface 323 of the positioning member 3 against the biasing action of the resilient element 73, as shown in FIG. 6. Subsequently, the handle unit 4 can be rotated clockwise about the pins 33 so that the engaging surface 710 of the sliding element 71 slides over the guiding surface 324 of the slide-engaging block 323, as shown in FIG. 7, thereby permitting folding of both the handle unit 4 and the rear wheel unit 6 on the front wheel unit 2, as shown in FIG. 8.

Figure 9:
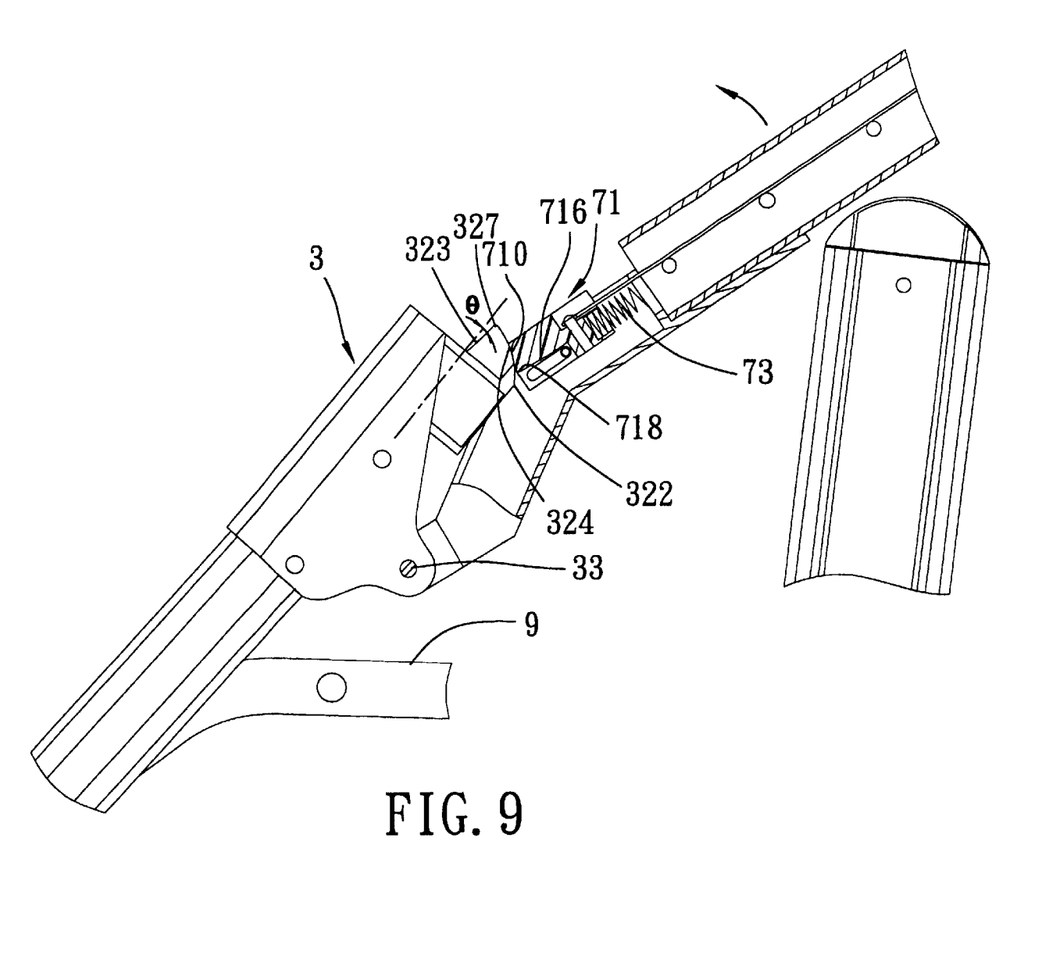
FIG. 9 is a schematic fragmentary side view of the preferred embodiment, illustrating how the sliding element slides over a slide-engaging block of the positioning member.

When it is desired to unfold the stroller, the handle unit 4 is rotated counterclockwise about the pins 33 so that the engaging surface 710 of the sliding element 71 slides over the guiding surface 324 of the positioning member 3, as shown in FIG. 9. When the sliding element 71 moves to an unlocking position shown in FIG. 6, where the limiting pin 77 is located at the lower end of the slide slot 717, the tip 718 of the sliding element 71 will be biased by the resilient element 73 to press against the stop surface 311 of the positioning member 3 such that the sliding element 71 is disposed at a locking position shown in FIG. 5, where the limiting pin 77 is located at the upper end of the slide slot 717 and where the abutment surface 716 of the sliding element 71 engages the positioning surface 323 of the positioning member 3, thereby preventing rotation of the handle unit 4 relative to the front wheel unit 2.

Because the abutment surfaces 716 and the positioning surfaces 323 are inclined with respect to the longitudinal directions of the upper and lower rods 42, 21, and because the sliding elements 71 are biased by the resilient elements 73 to engage the positioning members 3, the handle unit 4 can be locked effectively on the front and rear wheel units 2, 6.

With this invention thus explained, it is apparent that numerous modifications and variations can be made without departing from the scope and spirit of this invention. It is therefore intended that this invention be limited only as indicated by the appended claims.

I claim:

1. A foldable stroller comprising:
   a front wheel unit including a pair of rearwardly and upwardly inclined left and right lower rods, each of which has an upper end;
   two positioning members disposed respectively and fixedly on said upper ends of said left and right lower rods, each of said positioning members having an upper end, which is formed with
      a rearwardly and upwardly inclined planar positioning surface forming an acute angle with respect to a longitudinal direction of said left and right lower rods, and
      a guiding surface extending generally and downwardly from said upper end of said positioning surface;
   a handle unit including a grip and a pair of inclined left and right upper rods that are fixed to and that extend respectively, forwardly and downwardly from two opposite ends of said grip, each of said left and right upper rods being parallel to said left and right lower rods and having a lower end;
   two guideway members disposed respectively and fixedly on said lower ends of said left and right upper rods and connected respectively and pivotally to said positioning members;

a rear wheel unit disposed pivotally on said lower ends of said left and right upper rods and located behind said front wheel unit;

a link for interconnecting pivotally said front and rear wheel units; and a pair of left and right control mechanisms, each of which includes a sliding element disposed slidably within a respective one of said guideway members and guided to move in the longitudinal direction of said left and right lower rods, said sliding element being formed with a planar abutment surface that engages said positioning surface of a respective one of said positioning members and that has a lower end, and an engaging surface that extends generally and upwardly from said lower end of said abutment surface, said abutment surface and said engaging surface defining a tip of said sliding element therebetween, a resilient element for biasing said abutment surface of said sliding element to engage said positioning surface of the respective one of said positioning members, thereby preventing rotation of said left and right upper rods relative to said left and right lower rods, an actuator element disposed operably on said handle unit, and an elongated connecting element having an upper end that is fastened to said actuator element, and a lower end that is fastened to said sliding element so that actuation of said actuator element results in separation of said abutment surface of said sliding element from said positioning surface of said positioning member against biasing action of said resilient element, thereby permitting folding of both said handle unit and said rear wheel unit on said front wheel unit, after which said handle unit and said rear wheel unit can be unfolded from said front wheel unit so that said engaging surface of said sliding element slides over said guiding surface of the respective one of said positioning members such that said abutment surface of said sliding element is biased by said resilient element to engage once again said positioning surface of the respective one of said positioning members.

2. The foldable stroller as claimed in claim 1, wherein each of said guideway members includes:

an inclined bottom wall having a front lower portion and a rear upper portion;

two side walls extending respectively, integrally and upwardly from two opposite sides of said bottom wall;

a partition formed integrally with an intermediate portion of said bottom wall and said side walls; and two spaced-apart insert plates extending respectively from upper end portions of said side walls toward each other and disposed parallel to said bottom wall so as to define a slide-receiving chamber among said front lower portion of said bottom wall, said side walls and said partition, said slide-receiving chamber receiving said sliding element slidably therein;

said sliding element having two opposite vertical side surfaces, each of which is formed with an open-ended slide slot, within which a respective one of said insert plates of said guideway members is received slidably;

said resilient element being disposed within said slide-receiving chamber between said partition and said sliding element and between said bottom wall and said side walls, thereby biasing said sliding element away from said partition.

3. The foldable stroller as claimed in claim 2, wherein each of said positioning members includes two aligned integral lugs, each of which is formed with a hole, each of said guideway members having a lower end with an integral pivot portion that has a hole, said foldable stroller further including two horizontal pivot pins, each of which extends through said hole in a respective one of said guideway members and said holes in said lugs of a respective one of said positioning members, thereby connecting said guideway members rotatably to said positioning members.

4. The foldable stroller as claimed in claim 2, wherein each of said partitions is formed with an open-ended slot therethrough, said left and right upper rods being constructed as hollow tubes, each of said connecting elements being constructed as a cable that extends through a respective one of said open-ended slots and into a respective one of said left and right upper rods.

5. The foldable stroller as claimed in claim 4, further comprising two lock pins, each of which is fixed on a respective one of said sliding elements, said lower ends of said connecting elements being fastened to said lock pins, respectively.

6. The foldable stroller as claimed in claim 4, wherein each of said left and right upper rods has an upper end portion that is formed with a longitudinal slot through a wall thereof, said foldable stroller further including two sliding pins, which extend respectively through said longitudinal slots in said left and right upper rods in a transverse direction of said left and right upper rods, said upper ends of said connecting elements being fastened to said sliding pins, respectively.

7. The foldable stroller as claimed in claim 6, wherein each of said actuator elements is constructed as a sliding sleeve, which is sleeved slidably on a respective one of said left and right upper rods and which is connected fixedly to a respective one of said sliding pins, said foldable stroller further including two locking units for locking said actuator elements releaseably on said left and right upper rods.

8. The foldable stroller as claimed in claim 7, wherein each of said locking units includes:

a swing arm having an intermediate portion disposed pivotally on a respective one of said left and right upper rods, a pressing end, and an actuating end; and a torsion spring for biasing said pressing end of said swing arm to press against a respective one of said actuator elements, thereby preventing movement of the respective one of said actuator elements on the respective one of said left and right upper rods, said actuating end of said swing arm being capable of being driven to release said pressing end of said swing arm from the respective one of said actuator elements, thereby permitting the movement of the respective one of said actuator elements on the respective one of said left and right upper rods.

9. The foldable stroller as claimed in claim 1, wherein said acute angle is between 5° and 10°.

\* \* \* \* \*